May 8, 1951      J. G. CAPSTAFF      2,552,255
CONTINUOUSLY DRIVEN PRINTING MACHINE
Filed Dec. 17, 1946
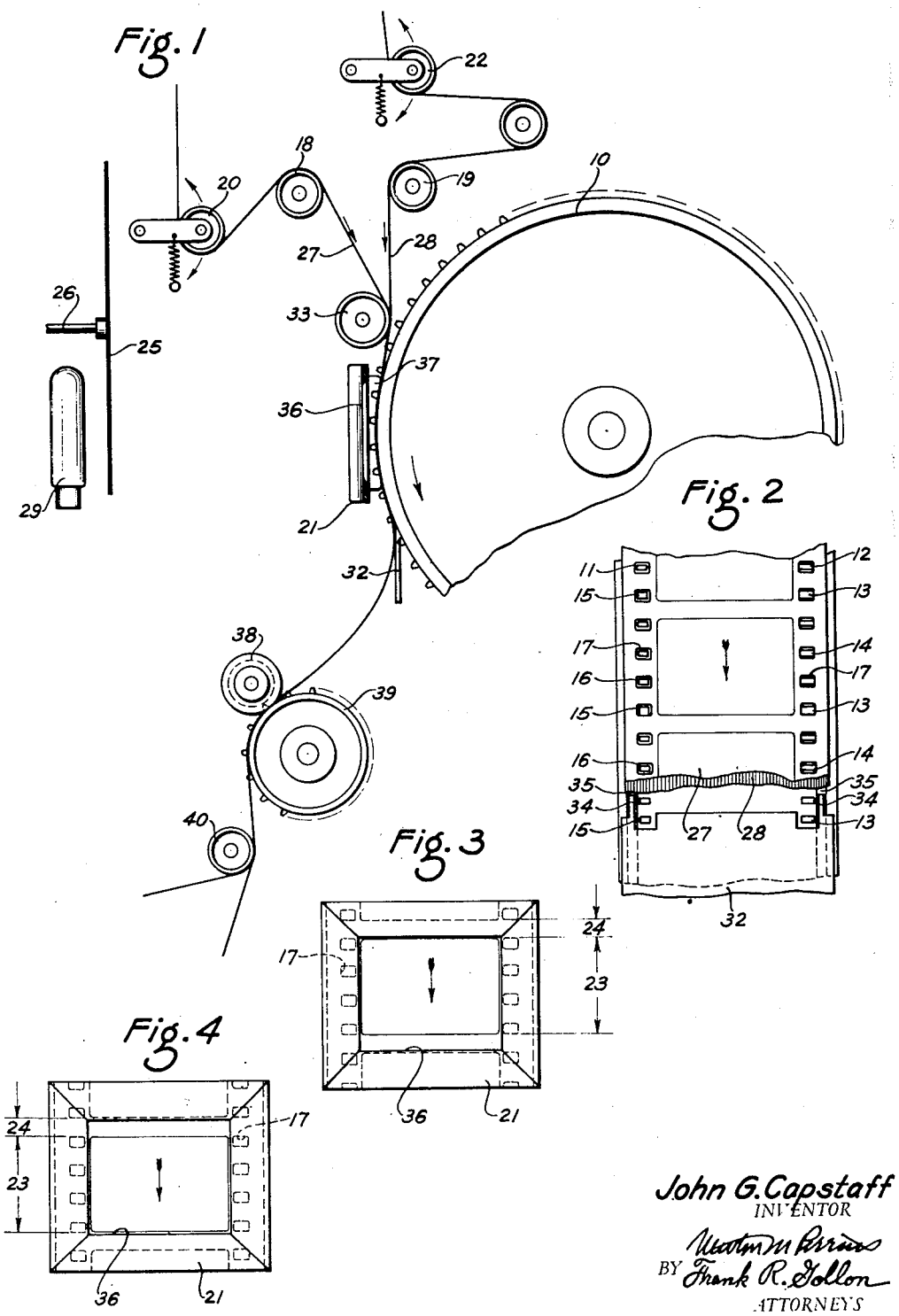
John G. Capstaff
INVENTOR
ATTORNEYS Patented May 8, 1951

2,552,255

UNITED STATES PATENT OFFICE 2,552,255

CONTINUOUSLY DRIVEN PRINTING MACHINE

John G. Capstaff, Rochester, N. Y., assignor to Eastman Kodak Company, Rochester, N. Y., a corporation of New Jersey Application December 17, 1946, Serial No. 716,714

21 Claims. (Cl. 95—75)

The present invention relates to a means for photographic printing. More specifically it relates to an improved printing machine adapted for continuously moving film past a light source which is projected intermittently upon the moving film.

Printing machines for motion picture film have been generally of two types, continuous and intermittent. While the former has been preferred from the standpoint of speed of operation, it offers serious difficulties in the matter of registration of the negative and positive films. This is caused primarily by differences in dimensions of the negative and positive films and by variations in the perforation sizes and in their spacing, this condition resulting from shrinkage of the film occasioned by processing and by aging. The problem of maintaining registration during the interval of exposure to a light source while continuously feeding the film through the printer has been a very real one. Shifting or creeping of one film relative to the other during exposure results in prints of poor definition which is especially objectionable in motion picture film because of the very considerable enlargement of the image projected upon the screen. Obviously, while the maintenance of registration during exposure is of prime importance in black and white printing, it is of even greater concern in color printing. Thus, in the duplication of color motion picture film, such as Kodachrome, the process often employed involves the printing of separation negatives from the tricolor master positive. In making these negatives, it is of particular importance that registration of the negative and positive films be maintained during the exposure interval. To insure perfect registration it is also necessary that the best possible contact be had between the negative and positive films at the printing aperture during exposure.

Prior art machines have in general met the difficulty of holding registration during the exposure interval by resorting to the use of an intermittent feed. In such devices the superposed films are fed intermittently to a position before the printing aperture, where they are caused to be registered both laterally and longitudinally despite variations in sizes caused by shrinkage of the film. Such registration has been accomplished by the use of pins which engage the film perforations after the films have been moved into position before the aperture. These pins are usually of such cross section that a single pin fills the superposed film perforations both laterally and longitudinally and others fill other film perforations in only one such dimension to compensate for small variations in perforation spacing in the two films. The exposure is made while the films are thus fixed in position, after which the pins are withdrawn and the films again advanced. Machines of this type are usually slower in operation than those of the continuous feed type. They are, moreover, more complicated because of the intermittent feed and reciprocating pin mechanisms.

Continuous printing machines have been designed to overcome the difficulties caused by the unequal shrinkage of the films which are run through the machines but these in general offer but partial solutions and, more often than not, involve complicated mechanisms.

It is, therefore, an object of the present invention to provide an improved printing machine in which the films are moved continuously and in which the difficulties resulting from unequal shrinkage of the films are effectively overcome.

It is a further object of this invention to provide improved means which prevent film creep in a continuous printer during the periods of exposure of the films.

It is a still further object of this invention to provide improved means which not only prevents longitudinal film creep, but simultaneously prevents relative lateral movement between the films during the printing operation.

It is a still further object of this invention to provide an improved continuous printer in which the means precluding relative lateral and longitudinal motion between the films is positioned immediately adjacent to the printing aperture for the most effective use thereof.

It is a still further object of this invention to provide a continuous printer in which the negative and positive films are firmly supported and relative motion therebetween, both lateral and longitudinal, effectively precluded at the printing aperture itself whereby prints of the highest definition will be obtainable.

It is a still further object of this invention to provide a continuous printer which is especially adapted for the duplication of color motion pictures involving the printing of separation negatives because of the improved characteristics of the machine in maintaining registration between the negative and positive films at the printing aperture during the exposure interval.

It is a still further object of this invention to provide a continuous printer which is relatively simple in construction and foolproof in operation.

Other objects and advantages of the invention will become apparent from the following description taken in connection with the accompanying drawing, and it will be understood that many changes may be made in the details of construction and arrangement of parts shown and described without departing from the spirit of the invention as expressed in the accompanying claims. For purposes of illustration the present invention is described as embodied in a contact printer. However, as would be obvious to one skilled in the art, the invention is equally applicable to a projection or optical printer of the type employing a single sprocket in which the negative is in limited engagement with one side of the sprocket and the positive with the other side. A printer of this type is disclosed in U. S. Letters Patent 1,584,185, granted to G. A. Mitchell, May 11, 1926. I, therefore, do not wish to be limited to the exact details shown and described as the preferred form only has been shown by way of illustration.

In the drawing, Figure 1 is a schematic view of a continuous contact printer embodying the present invention; Figure 2 is a partial view taken along the edge of the printing sprocket, showing the films superposed thereon and the film stripper; and Figures 3 and 4 illustrate, respectively, the position of the films relative to the printing aperture at the beginning and end of the exposure interval.

The continuous contact printer, embodying the present invention, shown in Figure 1 comprises a novel sprocket 10, having two rows 11 and 12 of teeth along its peripheral edge. Negative and positive films, 27 and 28, respectively, are advanced through the printer by means of the rotation of the sprocket. In row 12 every fourth tooth 13 is a film-locating tooth. After entering a film perforation 17, as will be described below, this tooth engages the advancing edge as well as the major portion of two sides of a standard Eastman perforation 17, which has parallel straight edges, the corners being formed with small arcs. The present invention is intended particularly for use with the square-type or Eastman-type of perforation, the straight sides of the perforations being obviously necessary for the satisfactory functioning of the printer as will be apparent from the following description. The tooth 13 is not of sufficient size to contact the trailing edge in addition to the advancing edge of the film perforation. Since it is the latter edge only which need be engaged to drive the film, it is preferable to shorten the teeth 13 in this particular direction, i. e. the thickness, in order that they may readily fit all film perforations despite small variations in the height thereof and in the pitch resulting from shrinkage. Between every pair of film-locating teeth 13 there is a series of three teeth 14 which are so dimensioned and positioned on the sprocket that they touch only the sides of the film perforations and neither the advancing nor trailing edges thereof. The teeth 14 serve only to position the films laterally. In row 11 every fourth tooth 15, as in row 12, is relatively larger than the others in the row. The tooth 15 corresponds to the tooth 13 in that it engages the advancing edge of the film perforations and together with it functions to advance the film through the printer. Unlike the teeth in row 12, tooth 15 is of a smaller width than that of the film perforations and is so located on the sprocket that it does not engage either of the side walls of the film perforations. Like tooth 13, however, the tooth 15 does not contact the trailing edge of the film perforations. Between every pair of teeth 15 in row 11, there are provided three teeth 16 which do not engage any of the walls of the film perforations. These teeth are merely dummies and may be omitted entirely. Their retention or omission will depend entirely upon manufacturing considerations.

The edge of the sprocket which mounts the above-described teeth comprises a solid, unbroken surface extending between the two rows of teeth and completely about the periphery of the sprocket, as seen in Figure 2, providing a rigid support for the superposed films as they travel over the sprocket. This positive support also assists in precluding relative movement between the films and, as will be obvious from the ensuing description, the support is provided at the point at which it will be the most effective, i. e. at the printing aperture. This peripheral surface is preferably a dull black to preclude reflections therefrom.

Rollers 18 and 19 are provided to carry the films from the supply reels (not shown) to the guide roller 33 where the films are superposed and brought into engagement with the sprocket. Spring-pressed or gravity-biased rollers 20 and 22, positioned between the rollers 18 and 19 and supply sprockets (not shown), provide back tension on the films in order that there may be continuous positive engagement between the teeth 13 and 15 and the advancing edges of the film perforations during the exposure interval. A film stripper 32 is provided to remove the films from the sprocket immediately after the printing exposure is made. The stripper includes a pair of spaced projections or blades 34 which run freely in the grooves 35 extending about the peripheral edge of the sprocket 10. Both the guide roller 33 and film stripper 32 are so positioned relative to each other and to the sprocket that the films have only limited engagement with the sprocket as noted in Figure 1. After leaving the sprocket 10, the films are guided by the roller 38 into engagement with the smaller sprocket 39 which is synchronized with the drive sprocket 10. The sprocket 39 is of the conventional type, its only function being to take up the films as they loop off the stripper. An idler roller 40 guides the films from the sprocket 39 toward the respective take-up reels for the negative and positive films.

A printer gate 21 includes spaced pressure shoes 37 which bear upon the superposed films along the edges beyond the perforations. The gate may be spring or gravity-biased to exert the required pressure against the films. The gate includes the printing aperture 36, the height of which is equal to the height 23 of a picture frame plus the distance 24 between frames; it is positioned immediately adjacent to that portion of the sprocket which is in engagement with the films. By locating the printing aperture adjacent to the drive means, which precludes relative slip between the superposed films, the possibility of relative motion between the films occurring at some other point in the travel of the film coinciding with the location of the printing aperture is thereby eliminated. Thus in the present invention no long or unsupported lengths of film exist between the drive means and the printing aperture. The existence of such a condition would result, despite the elimination of film creep at the drive, in relative motion of the films at the printing aperture caused, for example, by vibration of the unsupported lengths of film.

Since the sprocket 10 moves at a constant speed, the printing operation occurs while the films are moving. The exposure interval is synchronized with the sprocket so that the exposure occurs while the films move a distance equal to the distance 24 between picture frames. It should be noted that 35 mm. motion picture negatives have wider frame lines, that is a greater distance between adjacent frames, since the advent of sound. The exposure is controlled by the shutter 25 which rotates upon the shaft 26, the rotation of the latter being synchronized with the rotation of the sprocket 10. The exposure begins when the picture frame occupies the position relative to the printing aperture indicated in Figure 3. It is completed when this same picture frame has advanced to the position indicated in Figure 4. During this interval only two teeth, 13 and 15, one in each of the two opposed rows, have engaged advancing edges of the superposed film perforations to drive the films past the printing aperture. At the same time the teeth in row 12 have all served to register the films laterally despite possible variations in the dimensions between the two rows of perforations in the negative and positive films. The shutter closes as the films advance beyond the position indicated in Figure 4 and remains closed until the following picture frame has advanced to the position shown in Figure 3, at which time the shutter again opens. During this relatively longer period of non-exposure, the pair of teeth which has been in engagement with the leading edges of the film perforations reach a point where they begin to recede from the perforations with the rotation of the sprocket and the operation of the film stripper 32 as may be observed in Figure 1. At the same time the following pair of teeth 13 and 15 have entered the film perforations and presently engage the advancing edges of the film perforations to serve as the motive force for driving the films. The pitch or distance between the sprocket teeth is intentionally made slightly greater than the normal pitch of the film perforations. Therefore, slippage between the films and between the films and sprocket will occur, but by virtue of the arrangement and dimensioning of the sprocket teeth, above described, no slippage or creep takes place during the printing exposure. It occurs entirely during the dark interval when one pair of driving teeth 13 and 15 are substituted for another pair as the driving force for the superposed films. By providing that the pitch of the sprocket teeth be slightly greater than the normal pitch of the film perforations, it becomes possible to have somewhat more than four teeth (see Figure 1) simultaneously inserted in one row of film perforations, without more than one tooth engaging the leading edge of a film perforation.

Illumination for the printing is provided by the lamp 29 positioned immediately behind the shutter 25. A reflector and/or condenser system, though not necessary, may be employed in the conventional manner. In such an arrangement the shutter is preferably positioned close to the light source between the condenser and the lamp, although obviously it could be located also between the condenser and the printing aperture.

It is apparent that the present invention is also applicable to printers employing a driving sprocket having a single row of teeth thereon, the single row of teeth being similar to row 12. In such an arrangement every fourth tooth alone makes successive contact with the advancing edges of the superposed film perforations to drive the films during the exposure interval, the intermediate teeth serving only to assist in registering the films laterally. It is also apparent that instead of making such teeth as 13 and 15 thicker than those which follow them in their respective rows in order that the teeth 13 and 15 may alone make contact with the leading edges of the film perforations during the exposure period, the same end may be reached merely by controlling the longitudinal spacing of the teeth on the sprocket. Thus, by providing that every fourth tooth be spaced slightly ahead of the position it would otherwise occupy, such teeth could be made to alone engage the leading edges of the film perforations as required to preclude slippage.

From the foregoing description it will be apparent that I have provided means for obtaining all of the objects and advantages of this invention.

What I claim and desire to secure by Letters Patent of the United States is:

1. In a printing machine for use with continuously moving, superposed strips of film having perforations along an edge thereof, a sprocket for advancing said films, means for guiding said films into engagement with the sprocket and a film stripper for removing the films from the sprocket, said guide means and film stripper being so positioned relative to each other and to the sprocket that the films have only limited engagement with the sprocket, a source of illumination, a shutter and a printing aperture adapted to intermittently expose each picture frame, each exposure being made while the films are advanced a relatively short distance by the sprocket, said printing aperture being positioned adjacent to the films at the point at which they are in engagement with the sprocket, said sprocket having a row of teeth along its peripheral edge, the teeth being of a width substantially equal to the width of the film perforations and of a thickness less than the height of the perforations, the leading edges of said teeth being so spaced that but one such edge is in contact with the aligned edges of the perforations of the superposed film strips in the interval of exposure of the films to the source of illumination through said printing aperture and shutter.

2. In a printing machine for use with continuously moving, superposed strips of film having perforations along the edges thereof, a sprocket for advancing said films, means for guiding said films into engagement with the sprocket and a film stripper for removing the films from the sprocket, said guide means and film stripper being so positioned relative to each other and to the sprocket that the films have only limited engagement with the sprocket, a source of illumination, a shutter and a printing aperture adaped to intermittently expose each picture frame, each exposure being made while the films are advanced a relatively short distance by the sprocket, said printing aperture being positioned adjacent to the films at the point at which they are in engagement with the sprocket, said sprocket having two opposed rows of teeth along its peripheral edge, the teeth in one row being of a width substantially equal to the width of the film perforations and of a thickness less than the height of the perforations, the leading edges of said teeth being so spaced that but one such edge in said one row is in contact with the aligned edges of the perforations of the superposed film strips in the interval of exposure of the films to the source of illumination through said printing aperture and shutter, the teeth in the second row being of less width and of a smaller thickness than the corresponding dimensions of the film perforations, the leading edges of said second row of teeth being so spaced that but one such edge in said second row is in contact with the aligned edges of the perforations of the superposed film strips during the said interval of exposure.

3. In a printing machine for use with continuously moving, superposed strips of film having perforations along the edges thereof, a source of illumination, a shutter, a sprocket for advancing said films, means for continuously rotating said sprocket, means for guiding said films into engagement with the sprocket and a film stripper for removing the films from the sprocket, said guide means and film stripper being so positioned relative to each other and to the sprocket that the films have only limited engagement with the sprocket, a printing aperture aligned with said films, shutter and source of illumination, said printing aperture being positioned adjacent to the films at the point at which they are in engagement with the sprocket, said sprocket having two opposed rows of teeth mounted on the peripheral edge thereof and a substantially solid surface extending therebetween for supporting the engaged films, the teeth in one row being of a width substantially equal to the width of the film perforations, and of a thickness less than the height of the perforations, the leading edges of said teeth being so spaced that but one such edge in said one row is in contact with the aligned edges of the perforations of the superposed film strips in the interval of exposure of the films to the source of illumination through said printing aperture and shutter, the teeth in the second row being of less width and of a smaller thickness than the corresponding dimensions of the film perforations, the leading edges of said second row of teeth being so spaced that but one such edge in said second row is in contact with the aligned edges of the perforations of the superposed film strips during the said interval of exposure, the said leading edges of the teeth in one row which thus advance the films past the printing aperture being aligned with corresponding leading edges of the teeth in the second row.

4. In a printing machine for use with continuously moving, superposed strips of film having perforations along an edge thereof, a printing aperture, a sprocket for advancing said films past the printing aperture, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said guide means and film stripper being so positioned relative to each other and to the sprocket that the films have only limited engagement with the sprocket, said printing aperture being positioned adjacent to the films at the point at which they are in limited engagement with the sprocket, said sprocket having a substantially solid peripheral surface for supporting the engaged films and mounting a row of teeth thereon, a plurality of said teeth being of a width substantially equal to the width of the film perforations to register said films laterally, the teeth having a thickness less than the height of the perforations and being so spaced and the shutter being so synchronized with the rotation of the sprocket that the leading edge of only one tooth contacts the aligned edges of the perforations of the superposed film strips during the exposure interval to advance the films.

5. In a printing machine for use with continuously moving, superposed strips of film having perforations along the edges thereof, a printing aperture, a sprocket for advancing said films past the printing aperture, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said guide means and film stripper being so positioned relative to each other and to the sprocket that the films have only limited engagement with the sprocket, said printing aperture being positioned adjacent to the films at the point at which they are in limited engagement with the sprocket, said sprocket having two rows of teeth along the peripheral edge thereof and a substantially solid surface extending therebetween for supporting the engaged films, the teeth in one row being of a width substantially equal to the width of the film perforations and of a thickness less than the height of the perforations, the shutter being so synchronized with the rotation of the sprocket and the leading edges of said one row of teeth being so spaced that but one such edge contacts the aligned edges of the perforations of the superposed film strips during the interval of exposure to advance the films, the teeth in the second row being of less width and of a smaller thickness than the corresponding dimensions of the film perforations, such teeth having leading edges which are aligned with those of the teeth of the first row whose leading edges advance the film during the interval of exposure.

6. In a printing machine for use with continuously moving, superposed strips of film having perforations along an edge thereof, a printing aperture, a sprocket for advancing said films past the printing aperture, a source of illumination, a shutter interposed between the source of illumination and the films, means for continuously rotating said sprocket and for synchronously operating said shutter, a roller for guiding said films into engagement with the sprocket, means for providing a back tension on the films, a film stripper for removing the films from the sprocket, said roller and film stripper being so positioned relative to each other and to the sprocket that the films have only limited engagement with the sprocket, said printing aperture being positioned adjacent to the films at the point at which they are in limited engagement with the sprocket, said sprocket having a substantially solid peripheral surface for supporting the engaged films and mounting a row of teeth thereon, the teeth being of a width substantially equal to the width of the film perforations and of a thickness less than the height of the perforations, the shutter being so synchronized with the rotation of the sprocket and the leading edges of said teeth being so spaced that but one such edge contacts the aligned edges of the perforations of the superposed film strips during the interval of exposure to advance the films.

7. In a printing machine for use with continuously moving, superposed strips of film having perforations along the edges thereof, a printing aperture, a sprocket for advancing said films past the printing aperture, a source of illumination, a shutter interposed between the source of illumination and the films, means for continuously rotating said sprocket and for synchronously operating said shutter, a roller for guiding said films into engagement with the sprocket, means for providing a back tension on the films, a film stripper for removing the films from the sprocket, said roller and film stripper being so positioned relative to each other and to the sprocket that the films have only limited engagement with the sprocket, said printing aperture being positioned adjacent to the films at the point at which they are in limited engagement with the sprocket, said sprocket having two rows of teeth mounted on the peripheral edge thereof and a substantially solid surface extending therebetween for supporting the engaged films, a plurality of teeth in one row being of a width substantially equal to the width of the film perforations to register said films laterally, the teeth in said one row having a thickness less than the height of the perforations, their leading edges being so spaced and the shutter being so synchronized with the rotation of the sprocket that the leading edge of only one tooth in said one row contacts the aligned edges of the perforations of the superposed film strips during the exposure interval to advance the films, the teeth in the second row being of less width and of a smaller thickness than the corresponding dimensions of the film perforations, such teeth having leading edges which are aligned with those of the teeth of the first row whose leading edges advance the film during the exposure interval.

8. In a printing machine for use with continuously moving strips of negative and positive films having perforations along an edge thereof, a single sprocket for simultaneously advancing the negative and positive films, a printing aperture immediately adjacent said sprocket, means for projecting a beam of light through said aperture to image the negative film upon the positive, a shutter interposed in the beam, means for continuously rotating said sprocket and for synchronously operating said shutter, means for guiding each of said films into engagement with the sprocket and means for stripping said films from the sprocket, said guide and stripping means being so positioned relative to the sprocket that each film has only limited engagement with the sprocket, the printing aperture being positioned at such a point of limited engagement, said sprocket having a row of teeth along its peripheral edge, a plurality of which are of a width substantially equal to the width of the film perforations, the teeth having a thickness less than the height of the perforations and being so spaced and the shutter being so synchronized with the rotation of the sprocket that each film is driven by a single tooth contacting the leading edge of a film perforation during the exposure interval, the exposure of the positive film being effected at a point at which the film makes limited engagement with the sprocket.

9. In a printing machine for use with continuously moving strips of negative and positive films having perforations along the edges thereof, a single sprocket for simultaneously advancing the negative and positive films, a printing aperture immediately adjacent said sprocket, means for projecting a beam of light through said aperture to image the negative film upon the positive, a shutter interposed in the beam, means for continuously rotating said sprocket and for synchronously operating said shutter, means for guiding each of said films into engagement with the sprocket and means for stripping said films from the sprocket, said guide and stripping means being so positioned relative to the sprocket that each film has only limited engagement with the sprocket, the printing aperture being positioned at such a point of limited engagement, said sprocket having two rows of teeth along its peripheral edge, a plurality of teeth in one row being of a width substantially equal to the width of the film perforations, the teeth in said one row having a thickness less than the height of the perforations and being so spaced and the shutter being so synchronized with the rotation of the sprocket that each film is driven by a single tooth in said one row contacting the leading edge of a film perforation during the exposure interval, the teeth in the second row being of less width and of a smaller thickness than the corresponding dimensions of the film perforations, such teeth having leading edges which are aligned with those of the teeth of the first row which drive each of the films during the exposure interval, the exposure of the positive film being effected at a point at which the film makes limited engagement with the sprocket.

10. In a printing machine for use with continuously moving strips of negative and positive films having perforations along an edge thereof, a single sprocket for simultaneously advancing the negative and positive films, means for projecting a beam of light upon the films to image an area of one film equal to one picture frame plus a frame line upon the other, a shutter interposed in the beam, means for continuously rotating said sprocket and for synchronously operating said shutter, means for guiding each of said films into engagement with the sprocket and means for stripping each of the films from the sprocket, said guide and stripping means being so positioned relative to the sprocket that each film has only limited engagement with the sprocket, said sprocket having a row of teeth along its peripheral edge, a plurality of which are of a width substantially equal to the width of the film perforations, the teeth having a thickness less than the height of the perforations and being so spaced and the shutter being so synchronized with the rotation of the sprocket that each film is driven by a single tooth contacting the leading edge of a film perforation during the exposure interval, the exposure of each film to the beam being effected at the point at which each film is in limited engagement with the sprocket.

11. In a printing machine for use with a pair of continuously moving strips of film having perforations along the edges thereof, a single sprocket for simultaneously advancing the films, means for projecting a beam of light upon the films to image an area of one film equal to one picture frame plus a frame line upon the other, a shutter interposed in the beam, means for continuously rotating said sprocket and for synchronously operating said shutter, means for guiding each of said films into engagement with the sprocket and means for stripping each of the films from the sprocket, said guide and stripping means being so positioned relative to the sprocket that each film has only limited engagement with the sprocket, said sprocket having two rows of teeth along its peripheral edge, a plurality of teeth in one row being of a width substantially equal to the width of the film perforations, the teeth in said one row having a thickness less than the height of the perforations and being so spaced and the shutter being so synchronized with the rotation of the sprocket that each film is driven by a single tooth in said one row contacting the leading edge of a film perforation during the exposure interval, the teeth in the second row being of less width and of a smaller thickness than the corresponding dimensions of the film perforations, such teeth having leading edges which are aligned with those of the teeth of the first row which drive each of the films during the exposure interval, the exposure of each film to the beam being effected at the point at which each film is in limited engagement with the sprocket.

12. In a printing machine for use with continuously moving, superposed strips of film having perforations along an edge thereof, a printing aperture the height of which is equal to the height of a picture frame plus the distance between frames, a sprocket for advancing said films past the printing aperture, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said guide means and film stripper being so positioned relative to each other and to the sprocket that the films have only limited engagement with the sprocket, said printing aperture being positioned adjacent to the films at the point at which they are in limited engagement with the sprocket, said sprocket having a substantially solid peripheral surface for supporting the engaged films and mounting a row of teeth thereon, a plurality of said teeth being of a width substantially equal to the width of the film perforations, the teeth being of a thickness less than the height of the perforations and being so spaced and the shutter being so synchronized with the rotation of the sprocket that the leading edge of only one tooth contacts the aligned edges of the perforations of the superposed film strips to advance the films while but a single picture frame is being exposed.

13. In a printing machine for use with continuously moving, superposed strips of film having perforations along the edges thereof, a printing aperture the height of which is equal to the height of a picture frame plus the distance between frames, a sprocket for advancing said films past the printing aperture, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said guide means and film stripper being so positioned relative to each other and to the sprocket that the films have only limited engagement with the sprocket, said printing aperture being positioned adjacent to the films at the point at which they are in limited engagement with the sprocket, said sprocket having two rows of teeth along the peripheral edge thereof and a substantially solid surface extending therebetween for supporting the engaged films, a plurality of teeth in one row being of a width substantially equal to the width of the film perforations, the teeth in said one row being of a thickness less than the height of the perforations, the shutter being so synchronized with the rotation of the sprocket and the leading edges of said one row of teeth being so spaced that but one such edge contacts the aligned edges of the perforations of the superposed film strips to advance the films while but a single picture frame is being exposed, the teeth in the second row being of less width and of a smaller thickness than the corresponding dimensions of the film perforations, such teeth having leading edges which are aligned with those of the teeth of the first row whose leading edges each separately advance the film during the exposure of a picture frame.

14. In a printing machine for use with continuously moving, superposed strips of film having perforations along an edge thereof, a sprocket for driving said films, a printer gate having a printing aperture therein the height of which is equal to the height of a picture frame plus the distance between frames and having a shoe adapted to bear upon the films to hold the films in engagement with the sprocket as the films pass the aperture, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said guide means and film stripper being so positioned relative to each other and to the sprocket that the films have only limited engagement with the sprocket, said sprocket having a substantially solid peripheral surface for supporting the engaged films and mounting a row of teeth thereon, a plurality of said teeth being of a width substantially equal to the width of the film perforations, the teeth being of a thickness less than the height of the perforations and being so spaced and the shutter being so synchronized with the rotation of the sprocket that the leading edge of only one tooth contacts the aligned edges of the perforations of the superposed film strips to advance the films while but a single picture frame is being exposed.

15. In a printing machine for use with continuously moving, superposed strips of film having perforations along the edges thereof, a sprocket for driving said films, a printer gate having a printing aperture therein the height of which is equal to the height of a picture frame plus the distance between frames and having a shoe adapted to bear upon the films to hold the films in engagement with the sprocket as the films pass the aperture, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said guide means and film stripper being so positioned relative to each other and to the sprocket that the films have only limited engagement with the sprocket, said sprocket having two rows of teeth along the peripheral edge thereof and a substantial solid surface extending therebetween for supporting the engaged films, a plurality of teeth in one row being of a width substantially equal to the width of the film perforations, the teeth in said one row being of a thickness less than the height of the perforations, the shutter being so synchronized with the rotation of the sprocket and the leading edges of said one row of teeth being so spaced that but one such edge contacts the aligned edges of the perforations of the superposed film strips to advance the films while but a single picture frame is being exposed, the teeth in the second row being of less width and of a smaller thickness than the corresponding dimensions of the film perforations, such teeth having leading edges which are aligned with those of the teeth of the first row whose leading edges each separately advance the film during the exposure of a picture frame.

16. In a printing machine for use with continuously moving, superposed strips of film having perforations along an edge thereof, a printing aperture the height of which is equal to the height of a picture frame plus the distance between frames, a sprocket for advancing said films past the printing aperture, said sprocket having a substantially solid peripheral surface for supporting the engaged films, a groove in said peripheral surface and a row of teeth mounted on said surface, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said stripper including a projecting blade which rides freely in the peripheral groove in said sprocket, said guide means and film stripper being so positioned relative to each other and to the sprocket that the films have only limited engagement with the sprocket, said printing aperture being positioned adjacent to the films at the point at which they are in limited engagement with the sprocket, a plurality of the teeth in the row of teeth on said sprocket being of a width substantially equal to the width of the film perforations, the teeth being of a thickness less than the height of the perforations and being so spaced and the shutter being so synchronized with the rotation of the sprocket that the leading edge of only one tooth contacts the aligned edges of the perforations of the superposed film strips to advance the films while but a single picture frame is being exposed.

17. In a printing machine for use with continuously moving, superposed strips of film having perforations along the edges thereof, a printing aperture the height of which is equal to the height of a picture frame plus the distance between frames, a sprocket for advancing said films past the printing aperture, said sprocket having a substantially solid peripheral surface for supporting the engaged films, a groove in said peripheral surface and two rows of teeth mounted on said surface, means for projecting a beam of light through said aperture, a shutter interposed in the beam, means for continuously rotating said sprocket and for synchronously operating said shutter, means for guiding said films into engagement with the sprocket and a film stripper for removing the films from the sprocket, said stripper including a projecting blade which rides freely into the peripheral groove in said sprocket, said guide means and film stripper being so positioned relative to each other and to the sprocket that the films have only limited engagement with the sprocket, said printing aperture being positioned adjacent to the films at the point at which they are in limited engagement with the sprocket, a plurality of the teeth in one row of teeth on said sprocket being of a width substantially equal to the width of the film perforations, the teeth in said one row being of a thickness less than the height of the perforations, the shutter being so synchronized with the rotation of the sprocket and the leading edges of said one row of teeth being so spaced that but one such edge contacts the aligned edges of the perforations of the superposed film strips to advance the films while but a single picture frame is being exposed, the teeth in the second row being of less width and of a smaller thickness than the corresponding dimensions of the film perforations, such teeth having leading edges which are aligned with those of the teeth of the first row whose leading edges each separately advance the film during the exposure of a picture frame.

18. In a contact printing machine for use with continuously moving strips of film having perforations along an edge thereof, a printing aperture, a sprocket for advancing said films past the printing aperture, means for continuously rotating said sprocket, means for intermittently projecting a beam of light through said aperture, means for guiding said films into engagement with the sprocket, means for providing a back tension on the films, a film stripper for removing the films from the sprocket, said guide means and film stripper being so positioned relative to each other and to the sprocket that the films have only limited engagement with the sprocket, said printing aperture being positioned adjacent to the films at the point at which they are in limited engagement with the sprocket, said sprocket having a substantially solid peripheral surface for supporting the engaged films and mounting a row of teeth thereon, a plurality of said teeth being of a width substantially equal to the width of the film perforations to register said films laterally and being of a thickness less than the height of the perforations, intermediate teeth being of slightly greater thickness than the others, the rotation of the sprocket being synchronized with the intermittent projection of the beam of light through the printing aperture whereby a tooth of slightly greater thickness is the only tooth making contact with the aligned leading edges of the perforations of the superposed film strips during the exposure interval to advance the films without the occurrence of any relative movement between the superposed films during said exposure.

19. In a contact printing machine for use with continuously moving strips of film having perforations along the edges thereof, a printing aperture, a sprocket for advancing said films past the printing aperture, means for continuously rotating said sprocket, means for intermittently projecting a beam of light through said aperture, means for guiding said films into engagement with the sprocket, means for providing a back tension on the films, a film stripper for removing the films from the sprocket, said guide means and film stripper being so positioned relative to each other and to the sprocket that the films have only limited engagement with the sprocket, said printing aperture being positioned adjacent to the films at the point at which they are in limited engagement with the sprocket, said sprocket having two rows of teeth mounted on the peripheral edge thereof and a substantially solid surface extending therebetween for supporting the engaged films, a plurality of teeth in one row being of a width substantially equal to the width of the film perforations to register said films laterally and being of a thickness less than the height of the perforations, intermediate teeth in said one row being of slightly greater thickness than the others, the rotation of the sprocket being synchronized with the intermittent projection of the beam of light through the printing aperture whereby a tooth of slightly greater thickness is the only tooth in said one row making contact with the aligned leading edge of the perforations of the superposed film strips during the exposure interval to advance the films without the occurrence of any relative movement between the superposed films during said exposure, the second row of teeth being of less width and of smaller thickness than the corresponding dimensions of the film perforations, such teeth having leading edges which are aligned with those of the said teeth of slightly greater thickness.

20. In a contact printing machine for use with continuously moving strips of film having perforations along an edge thereof, a printing aperture, a sprocket for advancing said films past the printing aperture, means for projecting a beam of light through said aperture, a shutter interposed in the beam, means for continuously rotating said sprocket and for synchronously operating said shutter, a roller for guiding said films into engagement with the sprocket, means for providing a back tension on the films, a film stripper for removing the films from the sprocket, said roller and film stripper being so positioned relative to each other and to the sprocket that the films have only limited engagement with the sprocket, said printing aperture being positioned adjacent to the films at the point at which they are in limited engagement with the sprocket, said sprocket having a substantially solid peripheral surface for supporting the engaged films and mounting a row of teeth thereon, the teeth being of a width substantially equal to the width of the film perforations to register said films laterally, and being of a thickness less than the height of the film perforations, intermediate teeth being regularly of slightly greater thickness than the others, the rotation of the sprocket being synchronized with the operation of the shutter whereby a tooth of slightly greater thickness is the only tooth which contacts the aligned leading edges of the perforations of the superposed film strips during the exposure interval to advance the films, thereby precluding any relative movement between the superposed films during said exposure.

21. In a contact printing machine for use with continuously moving strips of film having perforations along the edges thereof, a printing aperture, a sprocket for advancing said films past the printing aperture, means for projecting a beam of light through said aperture, a shutter interposed in the beam, means for continuously rotating said sprocket and for synchronously operating said shutter, a roller for guiding said films into engagement with the sprocket, means for providing a back tension on the films, a film stripper for removing the films from the sprocket, said roller and film stripper being so positioned relative to each other and to the sprocket that the films have only limited engagement with the sprocket, said printing aperture being positioned adjacent to the films at the point at which they are in limited engagement with the sprocket, said sprocket having two rows of teeth mounted on the peripheral edge thereof and a substantially solid surface extending therebetween for supporting the engaged films, the teeth in one row being of a width substantially equal to the width of the film perforations to register said films laterally and being of a thickness less than the height of the perforations, intermediate teeth in said one row being regularly of slightly greater thickness than the others, the rotation of the sprocket being synchronized with the operation of the shutter whereby a tooth of slightly greater thickness is the only tooth in said one row which contacts the aligned leading edges of the perforations of the superposed film strips during the exposure interval to advance the films, thereby precluding any relative movement between the superposed films during said exposure, and the second row of teeth being of less width and of smaller thickness than the corresponding dimensions of the film perforations, such teeth having leading edges which are aligned with those of the said teeth of slightly greater thickness.

JOHN G. CAPSTAFF.

REFERENCES CITED

The following references are of record in the file of this patent:

UNITED STATES PATENTS

| Number | Name | Date |
| --- | --- | --- |
| 1,432,676 | De Brayer | Oct. 17, 1922 |
| 1,716,989 | Troland | June 11, 1929 |
| 1,738,095 | Carleton | Dec. 3, 1929 |
| 1,840,524 | Peck | Jan. 12, 1932 |
| 1,881,468 | Garbutt et al. | Oct. 11, 1932 |
| 2,058,409 | Capstaff | Oct. 27, 1936 |
| 2,071,878 | Huc | Feb. 23, 1937 |
| 2,098,371 | Bedford | Nov. 9, 1937 |
| 2,195,936 | Perkins et al. | Apr. 2, 1940 |
| 2,235,907 | Tondreau | Mar. 25, 1941 |
| 2,248,904 | Eggert et al. | July 8, 1941 |
| 2,395,970 | Kershaw | Mar. 5, 1946 |